United States Patent
Miller et al.

(10) Patent No.: US 10,654,577 B2
(45) Date of Patent: May 19, 2020

(54) RAINBOW FLOWPATH LOW PRESSURE TURBINE ROTOR ASSEMBLY

(71) Applicant: General Electric Company, Schenectady, NY (US)

(72) Inventors: Brandon Wayne Miller, Liberty Township, OH (US); Thomas Ory Moniz, Loveland, OH (US); Monty Lee Shelton, Loveland, OH (US); Joel Francis Kirk, Monroe, OH (US); Jeffrey Donald Clements, Mason, OH (US)

(73) Assignee: General Electric Company, Schenectady, NY (US)

( * ) Notice: Subject to any disclaimer, the term of this patent is extended or adjusted under 35 U.S.C. 154(b) by 599 days.

(21) Appl. No.: 15/439,122

(22) Filed: Feb. 22, 2017

(65) Prior Publication Data
US 2018/0238186 A1 Aug. 23, 2018

(51) Int. Cl.
| | | |
|---|---|---|
| *B64D 27/10* | (2006.01) | |
| *F02K 3/06* | (2006.01) | |
| *F02C 7/20* | (2006.01) | |
| *B64D 27/18* | (2006.01) | |

(52) U.S. Cl.
CPC ............ *B64D 27/10* (2013.01); *B64D 27/18* (2013.01); *F02C 7/20* (2013.01); *F02K 3/06* (2013.01); *F05D 2250/323* (2013.01); *F05D 2250/52* (2013.01); *F05D 2250/712* (2013.01); *Y02T 50/672* (2013.01)

(58) Field of Classification Search
CPC ... F02C 7/36; F02C 3/107; F02K 3/06; B64D 27/10; F01D 25/243
See application file for complete search history.

(56) References Cited

U.S. PATENT DOCUMENTS

| | | |
|---|---|---|
| 4,254,619 A | 3/1981 | Giffin, III et al. |
| 4,596,116 A | 6/1986 | Mandet et al. |
| 4,817,382 A * | 4/1989 | Rudolph ............... F02C 3/067 416/129 |
| 4,827,712 A | 5/1989 | Coplin |
| 5,577,378 A | 11/1996 | Althaus et al. |
| 5,627,761 A | 5/1997 | Pollard |

(Continued)

OTHER PUBLICATIONS

Kandebo, Geared-Turbofan Engine Design Target Costs, Complexity, 1998, Aviation Week & Space Technology, vol. 148 Issue 8 start p. 32.

(Continued)

*Primary Examiner* — Eldon T Brockman
(74) *Attorney, Agent, or Firm* — Dority & Manning, P.A.

(57) ABSTRACT

The present disclosure is directed to a gas turbine engine defining a radial direction, a longitudinal direction, and a circumferential direction, an upstream end and a downstream end along the longitudinal direction, and an axial centerline extended along the longitudinal direction. The gas turbine engine includes a low pressure (LP) turbine defining an outer flowpath. The outer flowpath defines a first outer flowpath radius at an upstream-most end of the LP turbine, a last outer flowpath radius disposed at a downstream-most end of the LP turbine, a middle outer flowpath radius disposed therebetween along the longitudinal direction. The middle outer flowpath radius is greater than the last outer flowpath radius.

18 Claims, 7 Drawing Sheets

(56) References Cited

U.S. PATENT DOCUMENTS

| | | | |
|---|---|---|---|
| 6,711,887 B2 * | 3/2004 | Orlando | F01D 1/26 415/199.5 |
| 6,761,034 B2 | 7/2004 | Niday et al. | |
| 7,137,245 B2 | 11/2006 | Graziosi et al. | |
| 7,600,370 B2 | 10/2009 | Dawson | |
| 7,694,505 B2 | 4/2010 | Schilling | |
| 7,770,377 B2 | 8/2010 | Rolt | |
| 7,845,158 B2 | 12/2010 | Udall | |
| 7,971,826 B2 | 7/2011 | Journade et al. | |
| 8,061,649 B2 | 11/2011 | Journade et al. | |
| 8,061,969 B2 | 11/2011 | Durocher et al. | |
| 8,074,440 B2 | 12/2011 | Kohlenberg et al. | |
| 8,371,812 B2 | 2/2013 | Manteiga et al. | |
| 8,517,666 B2 | 8/2013 | Alvanos et al. | |
| 8,534,077 B2 * | 9/2013 | Beutin | F01D 15/10 290/52 |
| 8,844,265 B2 | 9/2014 | Adams et al. | |
| 8,915,700 B2 | 12/2014 | Kupratis et al. | |
| 8,935,073 B2 | 1/2015 | Hurwitz et al. | |
| 9,032,740 B2 | 5/2015 | Journade et al. | |
| 9,121,347 B2 | 9/2015 | Bellabal et al. | |
| 9,284,887 B2 | 3/2016 | McKenney et al. | |
| 9,346,551 B2 | 5/2016 | Stretton | |
| 9,447,694 B2 | 9/2016 | Sanchez et al. | |
| 2008/0112802 A1 * | 5/2008 | Orlando | F02K 1/08 415/208.1 |
| 2010/0132371 A1 | 6/2010 | Durocher et al. | |
| 2011/0167835 A1 * | 7/2011 | Beutin | F01D 15/10 60/802 |
| 2012/0073263 A1 | 3/2012 | Kohlenberg et al. | |
| 2013/0062463 A1 | 3/2013 | Lord | |
| 2013/0192196 A1 | 8/2013 | Suciu et al. | |
| 2013/0192263 A1 | 8/2013 | Suciu et al. | |
| 2013/0219859 A1 * | 8/2013 | Suciu | F02C 3/113 60/268 |
| 2013/0294908 A1 | 11/2013 | Kuchana et al. | |
| 2014/0283501 A1 | 9/2014 | Schwarz et al. | |
| 2014/0286754 A1 | 9/2014 | Schwarz et al. | |
| 2015/0089958 A1 | 4/2015 | Suciu et al. | |
| 2015/0096303 A1 | 4/2015 | Schwarz et al. | |
| 2015/0308343 A1 | 10/2015 | Scott et al. | |
| 2015/0345404 A1 | 12/2015 | Adams et al. | |
| 2016/0010589 A1 | 1/2016 | Rolt | |
| 2016/0061052 A1 | 3/2016 | Suciu et al. | |
| 2016/0108757 A1 | 4/2016 | Mickelsen et al. | |
| 2016/0108814 A1 | 4/2016 | Schmitz | |
| 2016/0130980 A1 | 5/2016 | McKenney et al. | |
| 2016/0160800 A1 | 6/2016 | Knowles et al. | |
| 2016/0201569 A1 | 7/2016 | Schwarz et al. | |
| 2016/0201570 A1 | 7/2016 | Schwarz et al. | |
| 2016/0208699 A1 | 7/2016 | Cherolis et al. | |
| 2016/0214727 A1 | 7/2016 | Hamel et al. | |
| 2016/0230604 A1 | 8/2016 | Light et al. | |
| 2016/0238022 A1 | 8/2016 | Heikurinen et al. | |

OTHER PUBLICATIONS

Mattingly et al, Aircraft Engine Design, 2002, American Institute of Aeronautics and Astronautics, 2nd Edition, p. 292.

* cited by examiner

RAINBOW FLOWPATH LOW PRESSURE TURBINE ROTOR ASSEMBLY

FIELD

The present subject matter relates generally to gas turbine engine architecture.

BACKGROUND

Aircraft, such as commercial airliners, generally includes gas turbine engines mounted forward of a leading edge of a wing of the aircraft. In known configurations, at least the rotary members of the gas turbine engine (e.g., the turbine section, the compressor section, and the fan assembly) are disposed forward of the leading edge to mitigate risks relative to rotor failure.

Among direct drive gas turbine engines, a low pressure (LP) turbine and the fan assembly are each coupled to a LP shaft to define an LP spool without a reduction gearbox therebetween (i.e. the LP turbine and the fan assembly rotate at approximately the same rotational speed). In contrast, indirect drive gas turbine engines (e.g., geared turbofans) include a reduction gearbox disposed between the fan assembly and the LP turbine rotor. The gearbox generally proportionally reduces the fan assembly speed relative to the LP turbine rotor. Therefore, indirect drive LP turbine rotors generally rotate at greater speeds compared to direct drive LP turbine rotors. For example, some indirect drive LP turbines may rotate approximately three times the speed of a direct drive LP turbine.

However, increased efficiencies due to the faster rotating LP turbine and relatively low speed fan assembly are at least partially offset by increased risks to engines and the aircraft due to rotor failure (e.g., disks, hubs, drums, seals, impellers, blades, and/or spacers). Therefore, known indirect drive LP turbines generally require additional structures to at least reduce such risks to those comparable with the relatively low speed direct drive turbine.

Still further, indirect drive engine architecture introduces additional systems and assemblies (e.g., the reduction gearbox) relative to direct drive engines that generate other performance debits and aircraft risks. For example, in addition to risks from a relatively high speed LP turbine, the reduction gearbox adds weight, complexity, and novel failure modes to the engine and aircraft.

Therefore, there is a need for aircraft and engine systems that may include structural and risk benefits from a relatively low speed LP turbine while also improving aircraft efficiency.

BRIEF DESCRIPTION

Aspects and advantages of the invention will be set forth in part in the following description, or may be obvious from the description, or may be learned through practice of the invention.

The present disclosure is directed to a gas turbine engine defining a radial direction, a longitudinal direction, and a circumferential direction, an upstream end and a downstream end along the longitudinal direction, and an axial centerline extended along the longitudinal direction. The gas turbine engine includes a low pressure (LP) turbine defining an outer flowpath. The outer flowpath defines a first outer flowpath radius at an upstream-most end of the LP turbine, a last outer flowpath radius disposed at a downstream-most end of the LP turbine, a middle outer flowpath radius disposed therebetween along the longitudinal direction. The middle outer flowpath radius is greater than the last outer flowpath radius.

In one embodiment, the middle outer flowpath radius is greater than the first outer flowpath radius.

In various embodiments, the LP turbine further defines an inner flowpath, in which the inner flowpath further defines a first inner flowpath radius corresponding to the first turbine rotor, a middle inner flowpath radius corresponding to the middle turbine rotor, and a last inner flowpath radius corresponding to the last turbine rotor. The last inner flowpath radius is less than the middle inner flowpath radius and the first inner flowpath radius. In one embodiment, the middle inner flowpath radius is greater than the first inner flowpath radius.

In still various embodiments, the LP turbine includes a plurality of rotors disposed between the first turbine rotor and the last turbine rotor along the longitudinal direction. At least one of the rotors defines a maximum outer flowpath radius. In one embodiment, the LP turbine further includes a forward turbine case surrounding the outer flowpath upstream of the one or more middle turbine rotors defining the maximum outer flowpath radius. The LP turbine further includes a plurality of outer shroud segments at the one or more rotors defining the maximum outer flowpath radius and downstream thereof. The plurality of outer shroud segments are disposed generally equidistant of the outer flowpath and the plurality of outer shroud segments are coupled to the forward turbine case and extended toward the downstream end of the LP turbine.

In a further embodiment, the plurality of outer shroud segments together encompass a circumference around the outer flowpath. In yet another embodiment, the plurality of outer shroud segments further include one or more vanes attached thereto. In still another embodiment, the plurality of outer shroud segments are cantilevered from the forward turbine case toward the downstream end of the LP turbine. In still yet another embodiment, the LP turbine further includes an exhaust case disposed downstream of the LP turbine, in which the plurality of outer shroud segments are coupled to the exhaust cases at the downstream end of the plurality of outer shroud segments. In one embodiment, the LP turbine further includes an aft turbine case extended from the forward turbine case toward the downstream end of the LP turbine. The aft turbine case surrounds the plurality of outer shroud segments along the circumferential direction.

In still a further embodiment, the aft turbine case is disposed generally equidistant of the outer flowpath along the longitudinal direction. In one embodiment, the forward turbine case, the plurality of outer shroud segments, and the aft turbine case define an attachment interface.

In various embodiments, the plurality of outer shrouds define a first shroud proximate to the forward turbine case, a last shroud disposed at the downstream-most end of the LP turbine, and one or more middle shrouds disposed therebetween. In one embodiment, the first shroud corresponds approximately to the maximum outer flowpath radius. The one or more middle shrouds and last shroud together define a decreasing radius, and the last shroud corresponds approximately to the last outer flowpath radius.

In still various embodiments, the outer flowpath defines a rate of increase in the outer flowpath radius greater than a rate of increase in the inner flowpath radius of the inner flowpath, each from the upstream-most end of the LP turbine to the middle outer flowpath radius. In one embodiment, the outer flowpath radius defines a rate of decrease equal to or greater than a rate of decrease of the outer casing outward of the outer flowpath along the radial direction from the middle flowpath radius to the downstream-most end of the LP turbine.

In yet still various embodiments, the inner flowpath defines a rate of decrease of the inner flowpath radius greater than a rate of decrease of the outer flowpath radius of the outer flowpath, each from the middle outer flowpath radius to the downstream-most end of the LP turbine.

Another aspect of the present disclosure is directed to an aircraft defining a longitudinal direction, a latitudinal direction, and a transverse direction. The aircraft includes a fuselage extended along the longitudinal direction to which a pair or more of wings attaches along the transverse direction. The wing includes a pylon, and the wing defines a leading edge and a trailing edge. The leading edge defines a forward plane and the trailing edge defines an aft plane. The aircraft further includes a gas turbine engine coupled to the pylon of the wing. The engine includes a fan assembly that includes a plurality of fan blades rotatably coupled to a fan rotor. The engine further includes a LP turbine defining an outer flowpath, in which the outer flowpath defines a first outer flowpath radius at an upstream-most end of the LP turbine, a last outer flowpath radius disposed at a downstream-most end of the LP turbine, a middle outer flowpath radius disposed therebetween along the longitudinal direction. The middle outer flowpath radius is greater than the last outer flowpath radius.

In one embodiment, the middle outer flowpath radius is greater than the first outer flowpath radius, and the LP turbine further defines an inner flowpath in which the inner flowpath further defines a first inner flowpath radius corresponding to a first turbine rotor, a last inner flowpath radius corresponding to a last turbine rotor, a middle inner flowpath radius corresponding to one or more rotors therebetween along the longitudinal direction. The last inner flowpath radius is less than the middle inner flowpath radius and the first inner flowpath radius.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. Unless otherwise stated, "downstream" and "upstream" refer to the general direction of fluid flow of air or resulting combustion gases through a core flowpath of the engine from entry in the compressor section through exit from a turbine section.

Embodiments of an engine and aircraft are generally provided including a direct drive gas turbine engine that may include structural and risk benefits from a relatively low speed LP turbine while also improving aircraft efficiency. The engine includes a low pressure (LP) turbine defining an outer flowpath in which the outer flowpath defines a first outer flowpath radius at an upstream-most end of the LP turbine, a last outer flowpath radius disposed at a downstream-most end of the LP turbine, a middle outer flowpath radius disposed therebetween along the longitudinal direction. The middle outer flowpath radius is greater than the last outer flowpath radius.

In various embodiments, the engine further defines the middle outer flowpath radius greater than the first outer flowpath radius. In still various embodiments, the LP turbine further defines an inner flowpath in which the inner flowpath further defines a first inner flowpath radius corresponding to the first turbine rotor, a middle inner flowpath radius corresponding to the middle turbine rotor, and a last inner flowpath radius corresponding to the last turbine rotor. The last inner flowpath radius is less than the middle inner flowpath radius and the first inner flowpath radius.

The engine and the aircraft to which it attaches may enable mounting the LP turbine underneath a wing of the aircraft, thereby reducing the moment arm from a wing shear center of the wing to a center of gravity of the engine. Defining the middle outer flowpath radius greater than the last outer flowpath radius may enable reducing the moment arm from the wing shear center of the wing to the center of gravity of the engine. Reducing the moment arm may reduce weight of the wing, pylon, and/or engine, thereby increasing aircraft efficiency with direct drive gas turbine engines without the added complexity of a reduction gearbox or increased risks of a higher speed LP turbine.

In contrast to indirect drive engine configurations with high speed LP turbines, the embodiments shown and described herein may improve aircraft efficiency without the added systems, complexities, failure modes, or risks of an indirect drive engine. In various embodiments, approximately 318 kilograms (kg) of aircraft weight may be reduced for every 51 millimeter (mm) shift in a center of gravity of the gas turbine engine toward a leading edge of a wing of the aircraft along a longitudinal direction. In still various embodiments, shifting the center of gravity of the gas turbine engine toward the leading edge of the wing may improve aircraft fuel burn by 0.5% for every 51 mm shift. The embodiments described herein may further remove weight, parts, and risks unique to indirect drive engines relative to reduction gearbox failure.

Figure 1:
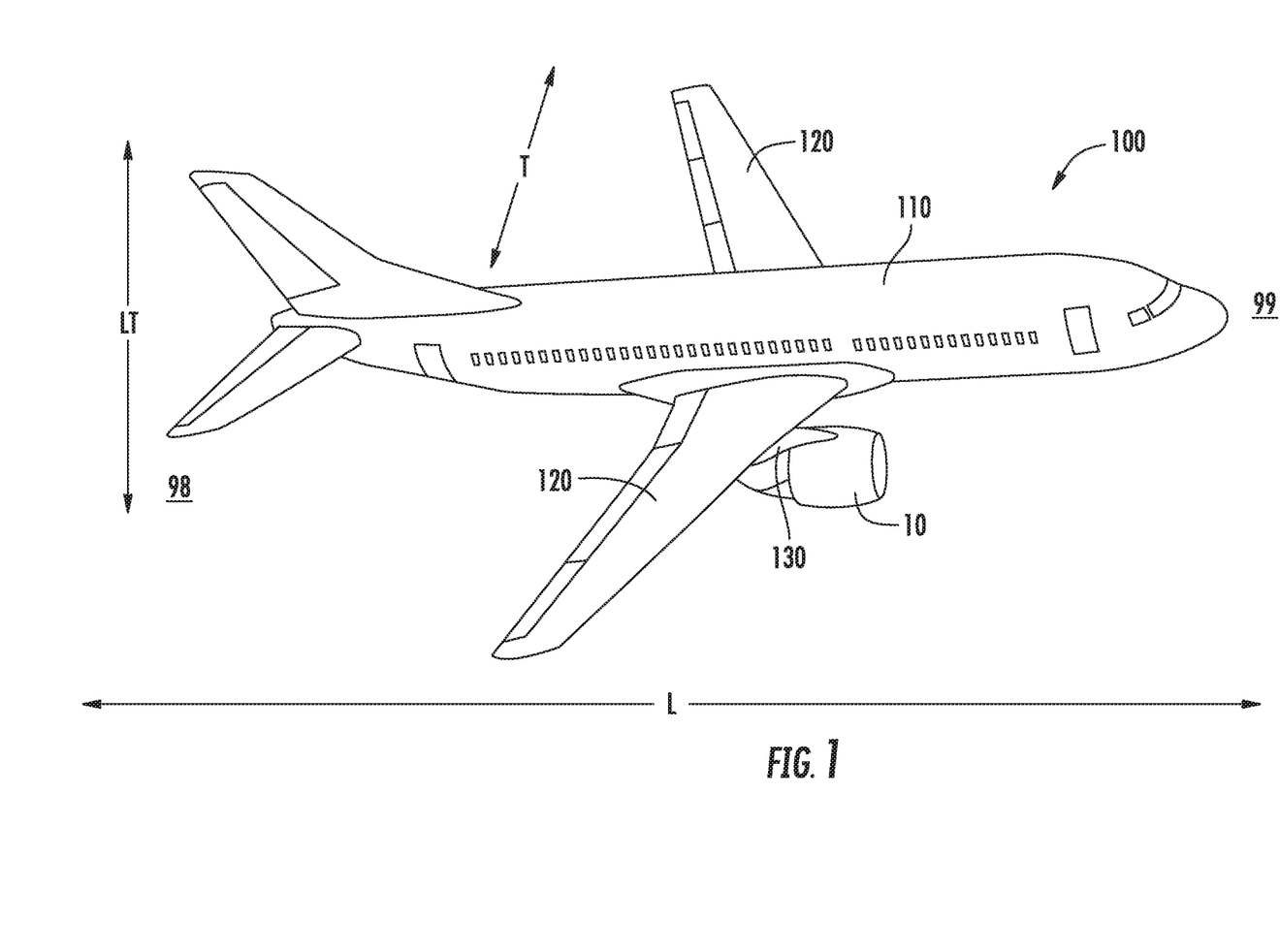
FIG. 1 is a perspective view of an exemplary embodiment of an aircraft including a direct drive engine according to an aspect of the present disclosure.

Referring now to FIG. 1, an exemplary embodiment of an aircraft 100 is generally provided. The aircraft 100 defines a longitudinal direction L, a latitudinal direction LT, and a transverse direction T, and an upstream end 99 and a downstream end 98 along the longitudinal direction L. The aircraft 100 includes a fuselage 110 extended generally along the longitudinal direction L. A pair of wings 120 each extend from the fuselage 110 of the aircraft 100. Each wing 120 includes a pylon 130 to which one or more gas turbine engines 10 (hereinafter "engine 10") attaches underneath the wing 120 (e.g., inward along the latitudinal direction LT). In various embodiments as shown and described herein, the exemplary embodiments of the engines 10 define a direct drive engine in which a low pressure turbine rotor attaches to a fan rotor without a reduction gearbox therebetween.

It should be understood that references to "upstream-most end", or "upstream of", are relative to a component or part toward the upstream end 99 as shown in the figures and generally understood in the art as the direction from which a fluid comes before and as it passes the area, part, or component in question. Similarly, references to "downstream-most end" or "downstream of" are relative to a component or part toward the downstream end 98 and is generally understood in the art as the direction to which a fluid goes as it passes the area, part, or component in question.

Figure 2:
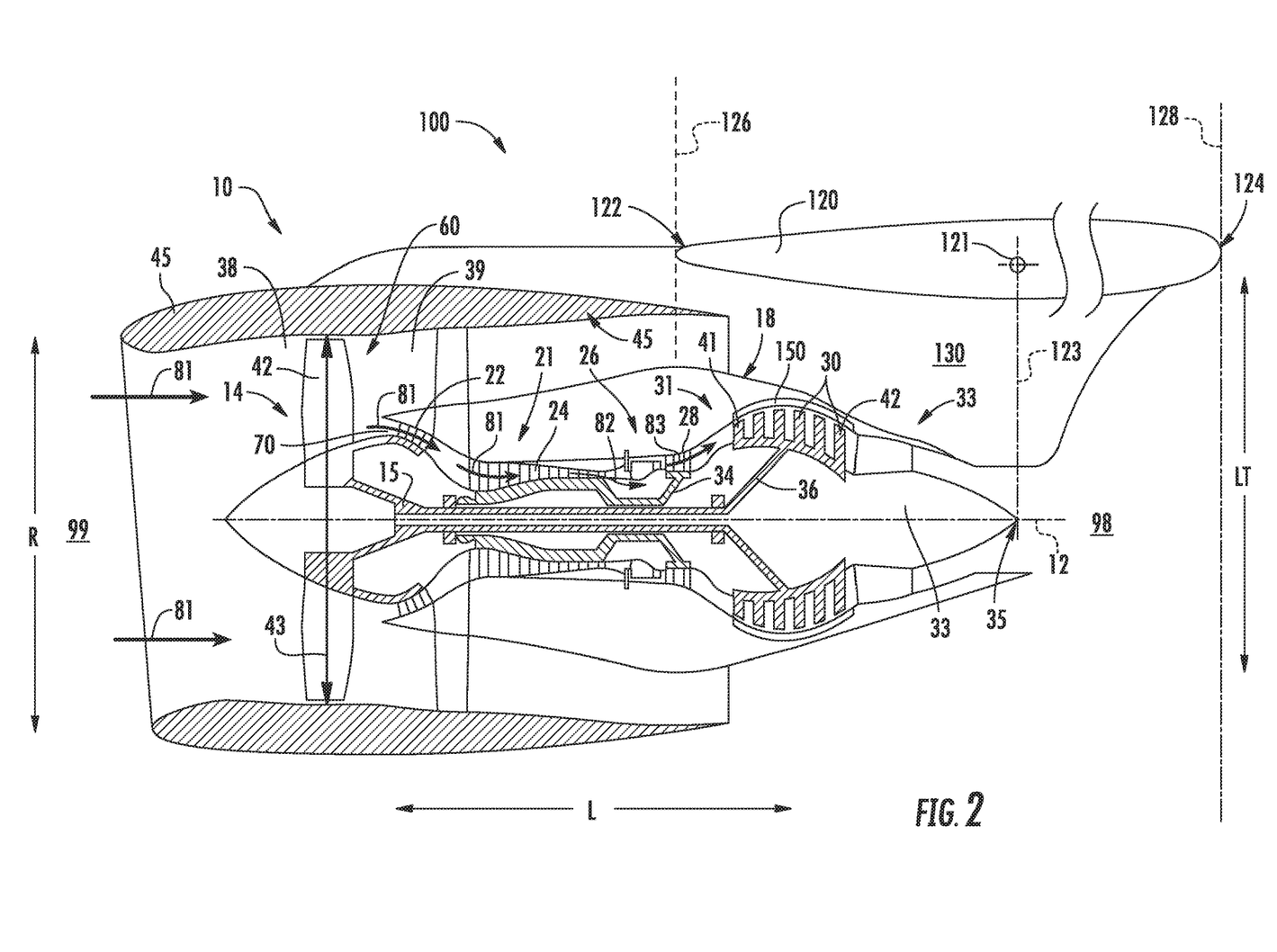
FIG. 2 is a cross sectional view of an exemplary embodiment of a gas turbine engine attached to a wing and pylon of an aircraft.

Referring now to FIG. 2, an exemplary embodiment of a portion of the aircraft 100 is generally provided. FIG. 2 may further provide detail as to the relative placement of the engine 10 to the wing 120 of the aircraft 100 such that overall aircraft efficiency is improved while defining the relative risks, and mitigations thereof, of a direct drive engine. The engine 10 defines an axial centerline 12 extended along the longitudinal direction L, and a radial direction R extended from the axial centerline 12. As shown in FIG. 2, each wing 120 defines a leading edge 122 and a trailing edge 124. As depicted schematically in FIG. 2, the leading edge 122 of the wing 120 defines a forward plane 126 extended along the latitudinal direction LT and the transverse direction T (shown in FIG. 1). The trailing edge 124 of the wing 120 defines an aft plane 128 extended along the latitudinal direction LT and the transverse direction T (shown in FIG. 1).

In various embodiments, the wing 120 further defines a wing shear center 121. The wing shear center 121 defines a point through which shear loads produce no twisting of the wing 120. The wing shear center 121 may further define a center of twist when torsional loads are applied to the wing 120. As depicted schematically in FIG. 1, the wing shear center 121 may further define a wing shear center plane 123 extended along the latitudinal direction LT and the transverse direction T (shown in FIG. 1).

Referring still to FIG. 2, the engine 10 includes, in serial flow arrangement along a longitudinal direction L, a fan assembly 14, a compressor section 21, a combustor section 26, a turbine section 31, and an exhaust nozzle assembly 33. The engine 10 extends generally along the longitudinal direction L, in which the exhaust nozzle assembly 33 defines a downstream-most end 35 that may be disposed approximately equal to the wing shear plane 123 along the longitudinal direction L. In various embodiments, disposing the downstream-most end 35 of the exhaust nozzle assembly 33 may further shift the engine 10, such as at a low pressure (LP) turbine 30, toward the wing shear center 121, and thereby reduce a moment arm from the engine 10 acting from the wing shear center 121. Reducing the moment arm from the wing shear center 121 may further reduce weight of the wing 120 and/or pylon 130, thereby improving aircraft efficiency. In one embodiment, the LP turbine 30 is disposed inward of the wing 120 along latitudinal direction LT. The LP turbine 30 is disposed between the forward plane 126 and the aft plane 128 of the wing 120 along the longitudinal direction L.

The compressor section 21 generally includes a low pressure (LP) compressor 22 and a high pressure (HP) compressor 24 in serial flow arrangement from the upstream end 99 to the downstream end 98. The turbine section 31 generally includes an HP turbine 28 and an LP turbine 30 in serial flow arrangement from the upstream end 99 to the downstream end 98. The combustion section 26 is disposed between the HP compressor 24 and the HP turbine 28. The HP compressor 24 and the HP turbine 28, with an HP shaft 34 rotatably coupling each, together define an HP spool.

Figure 3:
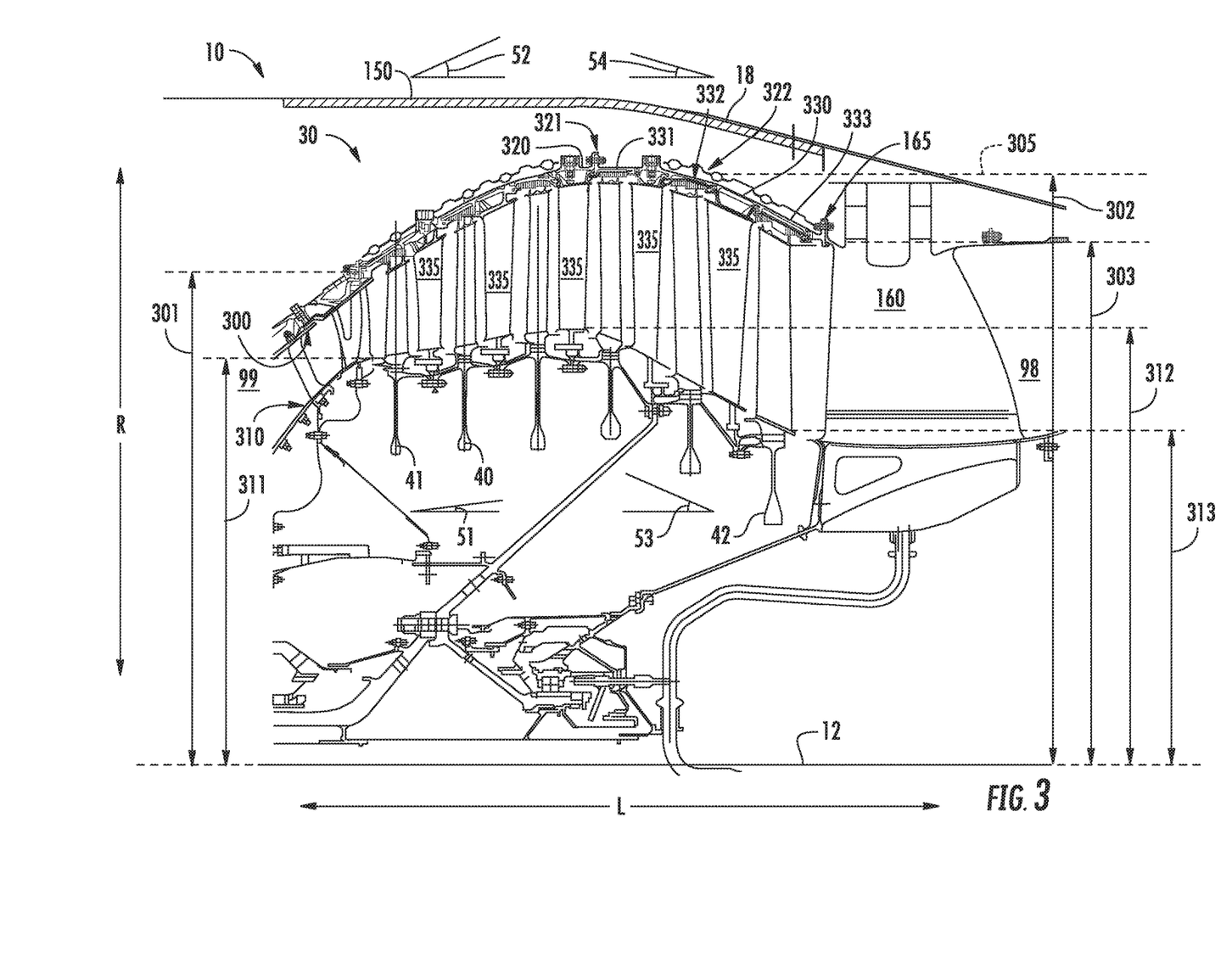
FIG. 3 is a cross sectional view of an exemplary embodiment of the LP turbine of the engine shown in FIGS. 1-2.

The fan assembly 14 includes a plurality of fan blades 42 rotatably coupled to a fan rotor 15. The fan rotor 15 is rotatably coupled toward the upstream end 99 of a driveshaft 36 extended along the longitudinal direction L. The LP turbine 30 is coupled to the driveshaft 36 and disposed at the downstream end 98 of the driveshaft 36. The fan assembly 14, LP compressor 22, driveshaft 36, and the LP turbine 30 together define an LP spool. In one embodiment, the LP turbine 30 defines at least four rotating stages or rotors 40. In another embodiment, such as shown in FIG. 3, the LP turbine 30 defines six or more rotating stages 40.

During operation of the engine 10, a drive motor begins rotation of the HP spool, which introduces air, shown schematically as arrows 81, into a core flowpath 70 of the engine 10. The air 81 passes across successive stages of the LP compressor 22 and the HP compressor 24 and increases in pressure to define compressed air 82 entering the combustion section 26. Fuel is introduced to the combustion section 26 and mixed with the compressed air 82 then ignited to yield combustion gases 83. Energy from the combustion gases 83 drives rotation of the HP turbine 28 and the LP turbine 30, as well as their respective HP and LP spools, and the fan assembly 14 and compressor section 21 to which each are attached. In one embodiment, the LP spool rotates about the axial centerline 12 at approximately 6000 revolutions per minute (RPM) or less. In another embodiment, the LP spool rotates about the axial centerline 12 at approximately 4000 RPM or less.

The cycle of introducing air 81 into the core flowpath 70, mixing with fuel, igniting, and producing combustion gases 83 provides energy to rotate the plurality of fan blades 42 about the axial centerline 12 of the engine 10. A portion of air 81 passes through a bypass duct 60 defined between a nacelle 45 and an outer casing 18 of the engine 10. The outer casing 18 is substantially tubular and surrounding the compressor section 21, the combustion section 26, and the turbine section 31 generally along the longitudinal direction L. In the embodiment described herein, the nacelle 45 may further include a fan case. The outer casing 18 may further include a cowl defining a generally aerodynamic flowpath of the bypass duct 60.

Referring still to FIG. 2, the fan blades 42 define a maximum fan diameter 43 along the radial direction R. The maximum fan diameter 43 is generally from tip to tip of diametrically opposed fan blades 42. Alternatively, the maximum fan diameter 43 may refer to an inner diameter of the nacelle 45 including a fan case surrounding the fan blades 42. The fan assembly 14 of the engine 10 further defines a fan pressure ratio measured generally from downstream of the fan blades 42 over the upstream of the fan blades 42 (i.e., a ratio of fan discharge pressure to fan inlet pressure). For example, the fan pressure ratio may be a ratio of the pressure downstream of the fan blades 42 shown schematically at point 39 over the pressure upstream of the fan blades 42 shown schematically at point 38. In various embodiments, the engine 10 defines a fan pressure ratio between approximately 1.0 and approximately 1.8.

Referring now to FIG. 3, an exemplary embodiment of the LP turbine 30 of the engine 10 is generally provided. Referring to FIGS. 1-3, the LP turbine 30 of the engine 10 further defines an outer flowpath 300. The outer flowpath 300 defines a first outer flowpath radius 301 at an upstream-most end of the LP turbine 30 and a last outer flowpath radius 303 disposed at the downstream-most end of the LP turbine 30. The outer flowpath 300 further defines a middle outer flowpath radius 302 disposed between the first outer flowpath radius 301 and the last outer flowpath radius 303 along the longitudinal direction L. The middle outer flowpath radius 302 is greater than the last outer flowpath radius 303. In one embodiment, the middle outer flowpath radius 302 is also greater than the first outer flowpath radius 301.

Referring still to FIG. 3, in various embodiments, the LP turbine 30 further defines an inner flowpath 310. The inner flowpath 310 defines a first inner flowpath radius 311 at the upstream-most end of the LP turbine 30 and a last inner flowpath radius 313 at the downstream-most end of the LP turbine 30. The inner flowpath 310 of the LP turbine 30 further defines a middle inner flowpath radius 312 disposed between the first inner flowpath radius 311 and the last inner flowpath radius 313 along the longitudinal direction L. The last inner flowpath radius 313 is less than the middle inner flowpath radius 312 and the first inner flowpath radius 311.

In one embodiment, the LP turbine 30 of the engine 10 defines a first turbine rotor 41 at an upstream-most end of the LP turbine 30 and a last turbine rotor 42 at a downstream-most end of the LP turbine 30. The first inner flowpath radius 311 and the first outer flowpath radius 301 may each correspond to the first turbine rotor 41 of the LP turbine 30. The last inner flowpath radius 313 and the last outer flowpath radius 303 may each correspond to the last turbine rotor 42.

In various embodiments, the middle inner flowpath radius 312 and the middle outer flowpath radius 302 may each correspond to any of several rotating stages or rotors 40 between the first turbine rotor 41 and the last turbine rotor 42 along the longitudinal direction L. In one embodiment, the middle inner flowpath radius 312 is greater than the first inner flowpath radius 311. It should be understood that the middle outer flowpath radius 302, relative to the first outer flowpath radius 301 and the last outer flowpath radius 303, may not correspond to the same rotor 40 as the middle inner flowpath radius 312 relative to the first inner flowpath radius 311 and the last inner flowpath radius 313.

In one embodiment, the outer flowpath 300 defines a rate of increase in radius greater than a rate of increase in radius of the inner flowpath 310 from the upstream-most end of the LP turbine 30 to the middle outer flowpath radius 302. In another embodiment, the inner flowpath 310 defines a rate of decrease in radius greater than a rate of decrease in radius of the outer flowpath, defined from the middle outer flowpath radius 302 to the downstream-most end of the LP turbine 30.

For example, referring still to FIG. 3, the outer flowpath 300 may define a first outer flowpath angle 52 from approximately the first outer flowpath radius 301 to approximately the middle outer flowpath radius 302 that is greater than a first inner flowpath angle 51 from approximately the first inner flowpath radius 311 to approximately the middle inner flowpath radius 312.

As another example, referring still to FIG. 3, the outer flowpath 300 may define a second outer flowpath angle 54 from approximately the middle outer flowpath radius 302 to the last outer flowpath radius 303 that is less than a second inner flowpath angle 53 from approximately the middle inner flowpath radius 312 to the last inner flowpath radius 313.

Figure 4:
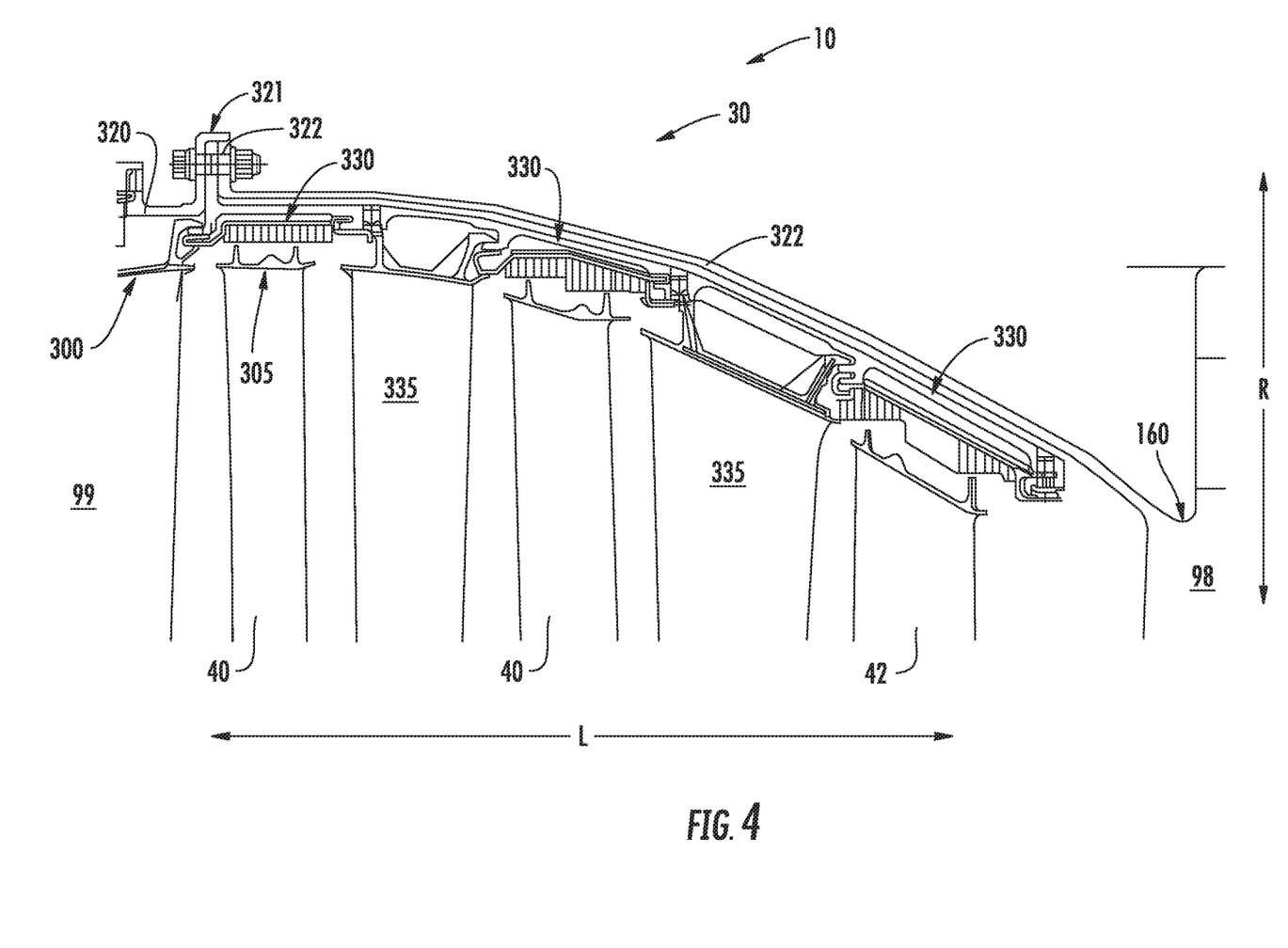
FIG. 4 is an exemplary embodiment of a portion of the LP turbine shown in FIG. 3.
Figure 5:
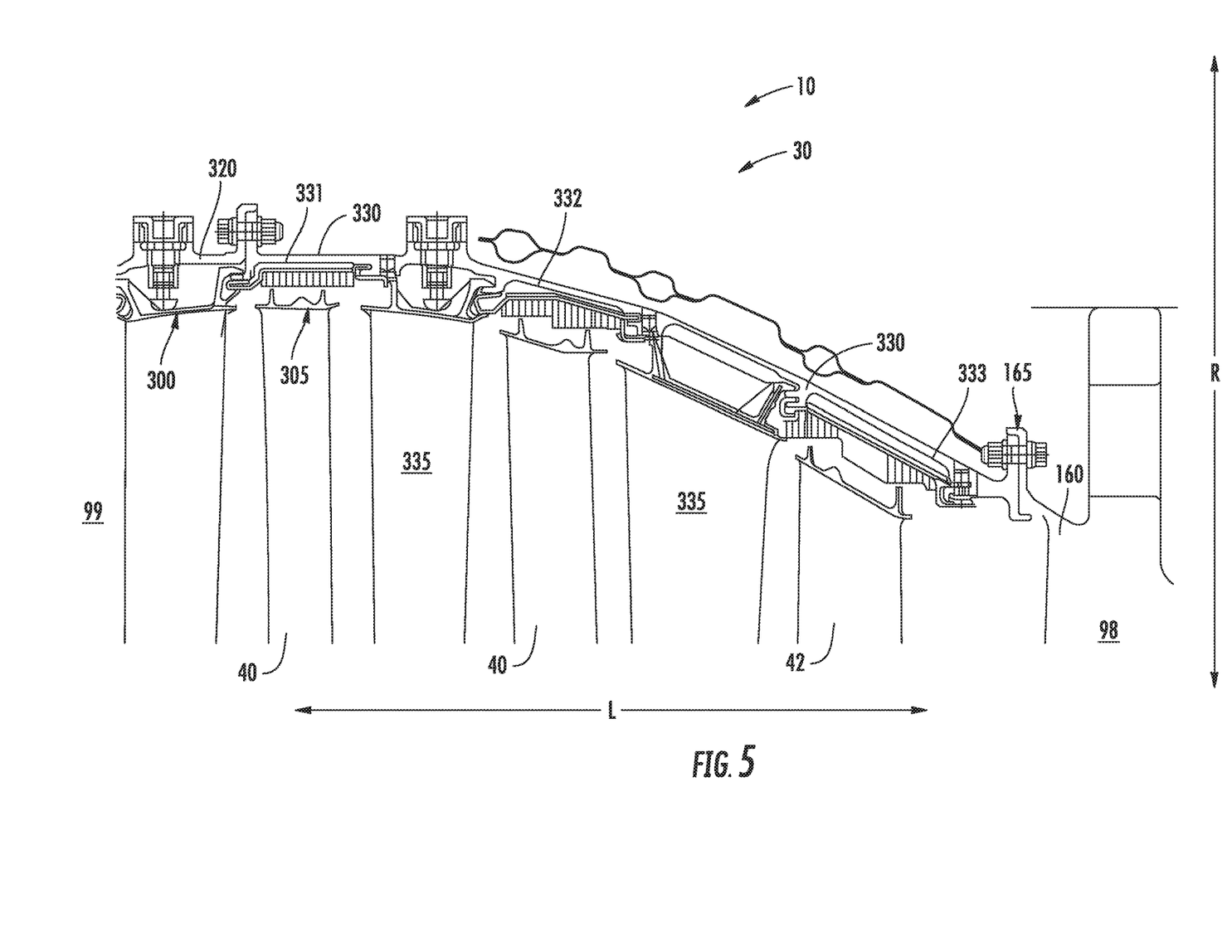
FIG. 5 is another exemplary embodiment of a portion of the LPT turbine shown in FIG. 3.

Referring now to FIGS. 4 and 5, exemplary embodiments of a portion of the LP turbine 30 are generally provided. In each embodiment, the LP turbine 30 further includes a forward turbine case 320 surrounding the outer flowpath 300 upstream of the one or more rotors 40 defining a maximum outer flowpath radius 305 of the outer flowpath 300 of the LP turbine 30. One or more rotors 40 downstream of the first turbine rotor 41 and upstream of the last turbine rotor 42 may define the maximum outer flowpath radius 305.

Referring still to FIGS. 4 and 5, the LP turbine 30 may include a plurality of outer shroud segments 330 at the one or more rotors 40 defining the maximum outer flowpath radius 305 and downstream thereof. The plurality of outer shroud segments 330 are disposed generally equidistant of the outer flowpath 300. The plurality of outer shroud segments 330 are coupled to the forward turbine case 320 and extended toward the downstream end 98 of the LP turbine 30.

In various embodiments, the plurality of outer shroud segments 330 together surround the outer flowpath 300 along a circumferential direction C (shown in FIG. 7) from one or more rotors 40 defining the maximum outer flowpath radius 305 and downstream thereof. The plurality of outer shroud segments 330 may further include one or more vanes 335 attached thereto. The plurality of outer shroud segments 330 may generally be segmented along the circumferential direction C as well as segmented along the longitudinal direction L such that each of the plurality of outer shroud segments 330 are pieced to the LP turbine 30 during assembly to encompass the outer flowpath 300. Additionally, each of the plurality of outer shroud segments 330 may be pieced to the LP turbine 30 such that the vanes 335 are disposed and assembled between successive stages of the rotors 40.

Referring still to the embodiments shown in FIGS. 4 and 5, the LP turbine 30 further includes an exhaust case 160 disposed downstream of the LP turbine 30. In the embodiment shown in FIG. 4, an aft turbine case 322 is coupled to the exhaust case 160. The aft turbine case 322 extends from the forward turbine case 320 toward the downstream end 98 of the LP turbine 30 and coupled to the exhaust case 160. The aft turbine case 322 surrounds the plurality of outer shroud segments 330 along the circumferential direction C (shown in FIG. 7) and along the longitudinal direction L. The aft turbine case 322 extends generally along the longitudinal direction L from the forward turbine case 320 at the one or more rotors 40 defining the maximum outer flowpath radius 305. The aft turbine case 322 may be disposed generally equidistant of the outer flowpath 300 along the longitudinal direction L.

Referring now to the embodiment shown in FIG. 4, the plurality of outer shroud segments 330 are cantilevered from the forward turbine case 320 toward the downstream end 98 of the LP turbine 30. The engine 10 may further define at the forward turbine case 320, at least a portion of the plurality of outer shroud segments 330, and the aft turbine case 322 a forward attachment interface 321. In various embodiments, the forward attachment interface 321 may couple the plurality of outer shroud segments 330 and vanes 335 to the forward turbine case and the aft turbine case 322 via one or more of mechanical fasteners or joining methods, including, but not limited to, bolts, nuts, screws, rivets, tie rods, pins, etc., or welding, soldering, brazing, or other bonding methods, or combinations thereof.

In the embodiment shown in FIG. 5, the plurality of outer shroud segments 330 are coupled to the exhaust case 160 at the downstream end 98 of the plurality of outer shroud segments 330. For example, the plurality of outer shroud segments 330 may define an attachment interface 165 between the plurality of outer shroud segments 330 and the exhaust case 160. In various embodiments, the attachment interface 165 may mate the plurality of outer shroud segments 330 to the exhaust case 160 via one or more of mechanical fasteners or joining methods, such as those previously mentioned.

Referring back to FIGS. 4 and 5, in various embodiments, the plurality of outer shrouds 330 may further define a first shroud 331 proximate to the forward turbine case 320 along the longitudinal direction L, a last shroud 333 disposed at the downstream-most end of the LP turbine 30, and one or more middle shrouds 332 disposed therebetween along the longitudinal direction L. In one embodiment, the first shroud 331 corresponds approximately to the maximum outer flowpath radius 305. The one or more middle shrouds 332 and the last shroud 333 together define a decreasing radius along the longitudinal direction L toward the downstream end 98 of the LP turbine 30. The last shroud 333 corresponds approximately to the last outer flowpath radius 303.

Figure 6:
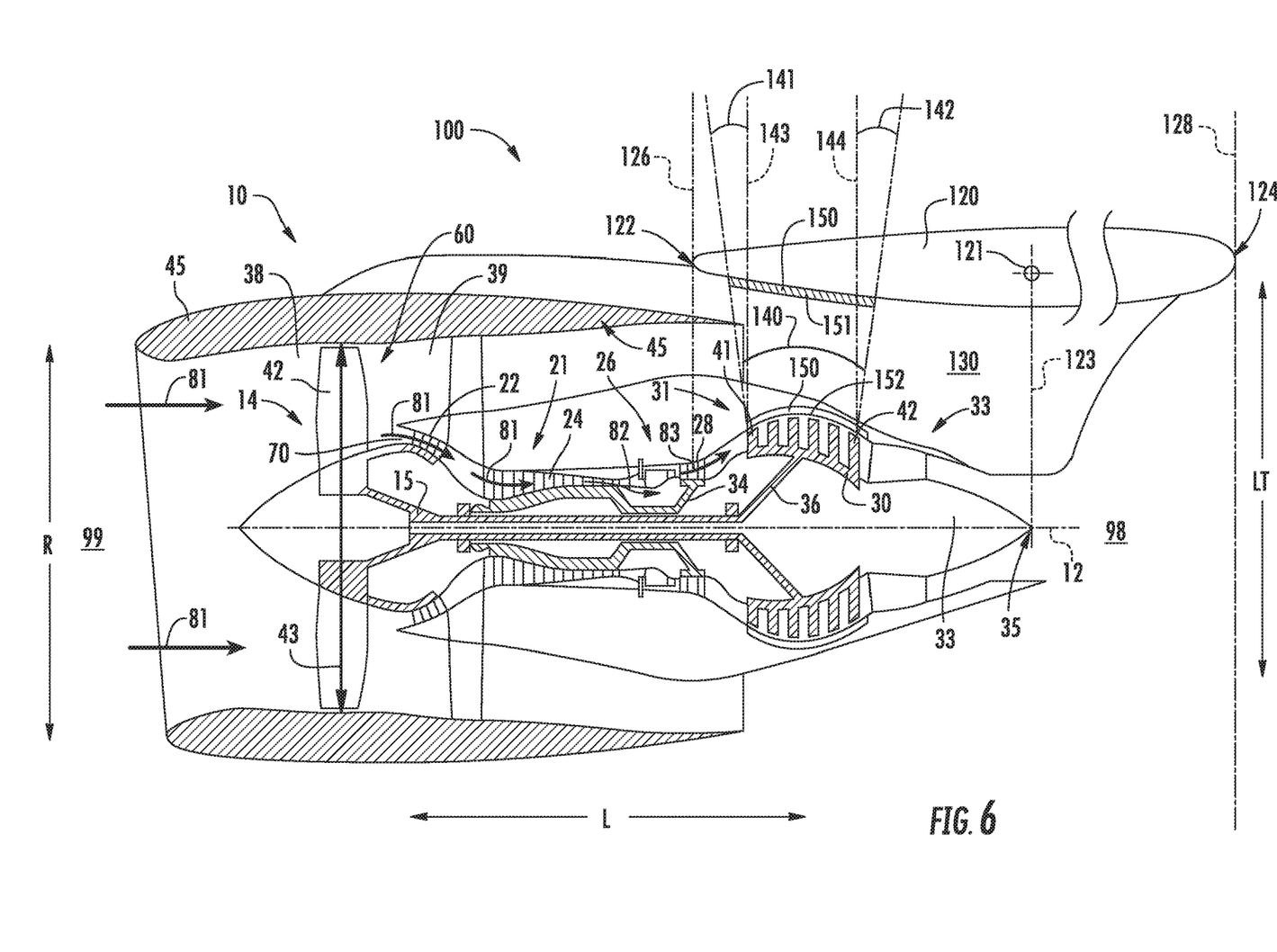
FIG. 6 is a cross sectional view of another exemplary embodiment of a gas turbine engine attached to a wing and pylon of an aircraft.

Referring now to FIG. 6, another exemplary embodiment of the portion of the aircraft 100 shown in FIGS. 1-5 is generally provided. In the embodiment shown in FIG. 6, and in conjunction with FIGS. 1-5, the LP turbine 30 of the engine 10 defines the first turbine rotor 41 at an upstream-most end of the LP turbine 30 and the last turbine rotor 42 at a downstream-most end of the LP turbine 30. The LP turbine 30 defines a turbine burst area 140 extended at a first angle 141 along a plane of rotation 143 of the first turbine rotor 41 toward the upstream end 99 of the gas turbine engine 10, and at a second angle 142 along a plane of rotation 144 of the last turbine rotor 42 toward the downstream end 98 of the gas turbine engine 10. Each plane of rotation 143, 144 extends along the radial direction R. Each plane of rotation 143, 144 may further extend along the transverse direction T (shown in FIG. 1).

Referring to FIG. 6, in one embodiment, the first angle 141 of the turbine burst area 140 is approximately 15 degrees or less. In another embodiment, the first angle 141 of the turbine burst area 140 is approximately 5 degrees or more.

Referring still to FIG. 6, in one embodiment, the second angle 142 of the turbine burst area 140 is approximately 15 degrees or less. In another embodiment, the second angle 142 of the turbine burst area 140 is approximately 5 degrees or more.

Referring now to FIGS. 1-6, in various embodiments, the turbine burst area 140 inward of the wing 120 along the latitudinal direction LT is defined within the forward plane 126 and within the aft plane 128 of the wing 120 along the longitudinal direction L.

Defining the turbine burst area 140 inward of the wing 120 along the latitudinal direction LT, and between the forward plane 126 and the aft plane 128 along the longitudinal direction L, may reduce pylon 130 and wing 120 weight by shifting the engine 10 toward the wing shear center 121 along the longitudinal direction L. Shifting the engine 10 toward the wing shear center 121 may reduce aircraft 100 weight and thereby increase aircraft efficiency. While further defining a direct drive engine, the overhung weight from the pylon 130 and the engine 10 may be reduced due to an absence of a reduction gearbox toward the upstream end 99 of the engine 10, thereby increasing the moment arm from the wing shear center 121, and ultimately, aircraft weight and inefficiency. By disposing the turbine burst area 140 within the forward plane 126 and the aft plane 128 of the wing 120, the weight of the pylon 130 and wing 120 are reduced while also maintaining risks and failure modes similar to and known among direct drive engines.

Figure 7:
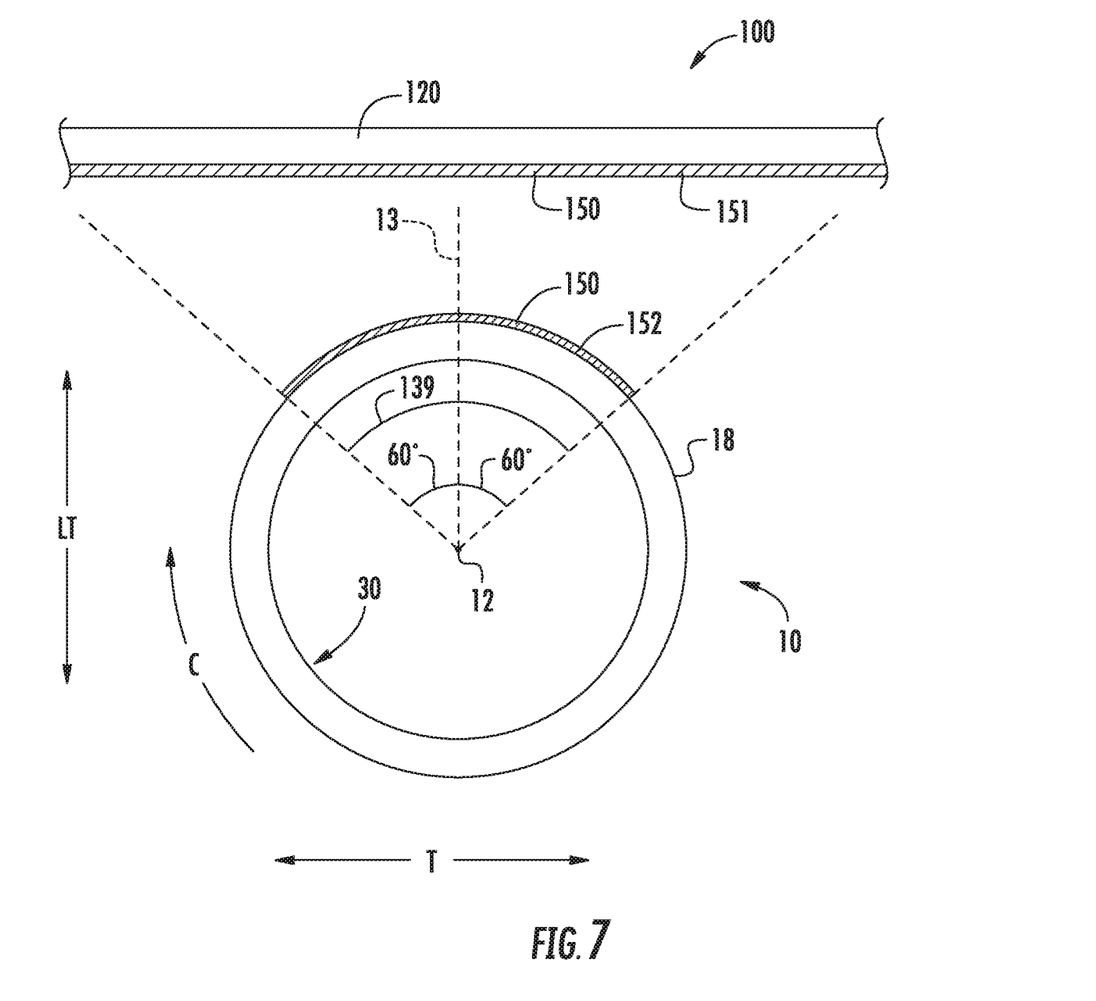
FIG. 7 is a planar view of an exemplary embodiment of the aircraft shown in FIGS. 1-4.

Referring now to FIGS. 1-7, embodiments of the aircraft 100 and engine 10 are generally provided, in which a containment shield 150 is further defined. In FIG. 7, a planar view of the aircraft 100 is provided along either plane of rotation 143, 144 (shown in FIG. 6). The containment shield 150 is extended over the LP turbine 30 along the longitudinal direction L. In various embodiments, the containment shield 150 extends from the first turbine rotor 41 through the last turbine rotor 42 along the longitudinal direction L. The containment shield 150 provides retention of LP turbine 30 rotor components that may liberate following a rotor failure. Rotor components may include disks, hubs, drums, seals, impellers, blades, and/or spacers, or fragments thereof, which may eject from the engine 10 generally within the turbine burst area 140.

In various embodiments, the containment shield 150 extends at least within a transverse turbine burst area 139. The transverse turbine burst area 139 may generally extend clockwise and/or counter-clockwise from a top dead center reference line 13. The top dead center reference line 13 is extended from the axial centerline 12 along the radial direction R. In one embodiment, the transverse turbine burst area 139 extends approximately 60 degrees or less clockwise and/or counter-clockwise from the top dead center reference line 13.

In one embodiment, the containment shield 150 may be coupled to the wing 120 of the aircraft 100, as shown at the first containment shield 151. The first containment shield 151 extends generally along the transverse direction T and within the transverse turbine burst area 139. In another embodiment, the containment shield 150 may be coupled to the outer casing 18 of the engine 10, as shown at the second containment shield 152. The second containment shield 152 extends at least partially in a circumferential direction C (shown in FIG. 7) from the top dead center reference line 13 extended from the axial centerline 12 of the engine 10. In various embodiments, the second containment shield 152 extends along the clockwise and/or counter-clockwise direction along the circumferential direction C from the top dead center reference line 13. In yet another embodiment, the second containment shield 152 may extend substantially circumferentially around the LP turbine 30 along the circumferential direction C (e.g., approximately 360 degrees).

The containment shield 150 may be constructed of, but not limited to, ceramic matrix composite (CMC) materials and/or metals appropriate for gas turbine engine containment structures, such as, but not limited to, nickel-based alloys, cobalt-based alloys, iron-based alloys, or titanium-based alloys, each of which may include, but are not limited to, chromium, cobalt, tungsten, tantalum, molybdenum, and/or rhenium.

The containment shield 150 may further, or alternatively, include a solid foamed synthetic polymer. In one embodiment, the solid foamed synthetic polymer may include a synthetic elastomer, such as an elastomeric polyurethane. In another embodiment, the solid foamed synthetic polymer may include an ethylene vinyl acetate and/or an olefin polymer.

In another embodiment, the containment shield 150 is formed from a plurality of fabric sheets formed from a plurality of fibers. In each sheet, the plurality of fibers may form a network of fibers (e.g., a woven network, a random or parallel nonwoven network, or another orientation). In particular, the containment shield 150 may be constructed from high strength and high modulus fibers, such as para-aramid synthetic fibers (e.g., KEVLAR fibers available from E.I. duPont de Nemours and Company), metal fibers, ceramic fibers, glass fibers, carbon fibers, boron fibers, p-phenylenetherephtalamide fibers, aromatic polyamide fibers, silicon carbide fibers, graphite fibers, nylon fibers, or mixtures thereof. Another example of suitable fibers includes ultra-high molecular weight polyethylene (e.g., SPECTRA fibers manufactured by Honeywell International Inc.).

The fibers of the containment shield 150 may have high tensile strength and high modulus that are highly oriented, thereby resulting in very smooth fiber surfaces exhibiting a low coefficient of friction. Such fibers, when formed into a fabric layer, generally exhibit poor energy transfer to neighboring fibers during intermittent transfers of energy or torque from rotor failure of the LP turbine 30 to surrounding structures, such as the outer casing 18 and/or the wing 120 of the aircraft 100.

The systems shown in FIGS. 1-7 and described herein may improve aircraft efficiency utilizing direct drive gas turbine engines by reducing a moment arm from the wing shear center 121 to the upstream end 99 of the engine 10, thereby reducing weight of the wing 120, pylon 130, and/or engine 10. Reducing the moment arm may be enabled by defining the maximum outer flowpath radius 305 of the LP turbine 30 at one or more rotors 40 between the first turbine rotor 41 and the last turbine rotor 42 of the LP turbine 30. Furthermore, the systems disclosed herein may improve aircraft 100 efficiency while utilizing direct drive gas turbine engines while obviating additional subsystems, risks, and failure modes introduced by indirect drive engines. Improvements to aircraft efficiency may include decreased weight, decreased system failure risks, and improved overall aircraft fuel burn.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction, a longitudinal direction, and a circumferential direction, an upstream end and a downstream end along the longitudinal direction, and an axial centerline extended along the longitudinal direction, the gas turbine engine comprising:
   a low pressure (LP) turbine defining an outer flowpath, wherein the outer flowpath defines a first outer flowpath radius at an upstream-most end of the LP turbine, a last outer flowpath radius disposed at a downstream-most end of the LP turbine, and a middle outer flowpath radius disposed therebetween along the longitudinal direction,
   wherein the middle outer flowpath radius is greater than the last outer flowpath radius,
   wherein the LP turbine further defines an inner flowpath, wherein the inner flowpath further defines a first inner flowpath radius corresponding to the first turbine rotor, a middle inner flowpath radius corresponding to the middle turbine rotor, and a last inner flowpath radius corresponding to the last turbine rotor, and
   wherein the last inner flowpath radius is less than the middle inner flowpath radius and the first inner flowpath radius.

2. The gas turbine engine of claim 1, wherein the middle outer flowpath radius is greater than the first outer flowpath radius.

3. The gas turbine engine of claim 1, wherein the middle inner flowpath radius is greater than the first inner flowpath radius.

4. The gas turbine engine of claim 1,
   wherein the LP turbine comprises a plurality of rotors disposed between the first turbine rotor and the last turbine rotor along the longitudinal direction, and
   wherein at least one of the rotors defines a maximum outer flowpath radius.

5. The gas turbine engine of claim 4,
   wherein the LP turbine further comprises:
   a forward turbine case surrounding the outer flowpath upstream of the one or more middle turbine rotors defining the maximum outer flowpath radius; and
   a plurality of outer shroud segments at the one or more rotors defining the maximum outer flowpath radius and downstream thereof,
   wherein the plurality of outer shroud segments are disposed generally equidistant of the outer flowpath, and
   wherein the plurality of outer shroud segments are coupled to the forward turbine case and extended toward the downstream end of the LP turbine.

6. The gas turbine engine of claim 5, wherein the plurality of outer shroud segments together encompass a circumference around the outer flowpath.

7. The gas turbine engine of claim 5, wherein the plurality of outer shroud segments further comprise one or more vanes attached thereto.

8. The gas turbine engine of claim 5, further comprising:
   an exhaust case disposed downstream of the LP turbine, wherein the plurality of outer shroud segments are coupled to the exhaust cases at the downstream end of the plurality of outer shroud segments.

9. The gas turbine engine of claim 5, wherein the LP turbine further comprises an aft turbine case extended from the forward turbine case toward the downstream end of the LP turbine, and wherein the aft turbine case surrounds the plurality of outer shroud segments along the circumferential direction.

10. The gas turbine engine of claim 9, wherein the aft turbine case is disposed generally equidistant of the outer flowpath along the longitudinal direction.

11. The gas turbine engine of claim 9, wherein the forward turbine case, the plurality of outer shroud segments, and the aft turbine case define an attachment interface.

12. The gas turbine engine of claim 5, wherein the plurality of outer shrouds define a first shroud proximate to the forward turbine case, a last shroud disposed at the downstream-most end of the LP turbine, and one or more middle shrouds disposed therebetween.

13. The gas turbine engine of claim 12, wherein the first shroud corresponds approximately to the maximum outer flowpath radius, wherein the one or more middle shrouds and last shroud together define a decreasing radius, and wherein the last shroud corresponds approximately to the last outer flowpath radius.

14. The gas turbine engine of claim 1, wherein the outer flowpath defines a rate of increase in the outer flowpath radius greater than a rate of increase in the inner flowpath radius of the inner flowpath, each from the upstream-most end of the LP turbine to the middle outer flowpath radius.

15. The gas turbine engine of claim 14, wherein the outer flowpath radius defines a rate of decrease equal to or greater than a rate of decrease of the outer casing outward of the outer flowpath along the radial direction from the middle flowpath radius to the downstream-most end of the LP turbine.

16. The gas turbine engine of claim 1, wherein the inner flowpath defines a rate of decrease of the inner flowpath radius greater than a rate of decrease of the outer flowpath radius of the outer flowpath, each from the middle outer flowpath radius to the downstream-most end of the LP turbine.

17. A gas turbine engine defining a radial direction, a longitudinal direction, and a circumferential direction, an upstream end and a downstream end along the longitudinal direction, and an axial centerline extended along the longitudinal direction, the gas turbine engine comprising:

a low pressure (LP) turbine defining an outer flowpath, wherein the outer flowpath defines a first outer flowpath radius at an upstream-most end of the LP turbine, a last outer flowpath radius disposed at a downstream-most end of the LP turbine, and a middle outer flowpath radius disposed therebetween along the longitudinal direction, wherein the middle outer flowpath radius is greater than the last outer flowpath radius, wherein the LP turbine comprises a plurality of rotors disposed between the first turbine rotor and the last turbine rotor along the longitudinal direction, wherein at least one of the rotors defines a maximum outer flowpath radius, wherein the LP turbine further comprises:

a forward turbine case surrounding the outer flowpath upstream of the one or more middle turbine rotors defining the maximum outer flowpath radius; and a plurality of outer shroud segments at the one or more rotors defining the maximum outer flowpath radius and downstream thereof, wherein the plurality of outer shroud segments are disposed generally equidistant of the outer flowpath, wherein the plurality of outer shroud segments are coupled to the forward turbine case and extended toward the downstream end of the LP turbine, and wherein the plurality of outer shroud segments are cantilevered from the forward turbine case toward the downstream end of the LP turbine.

18. An aircraft defining a longitudinal direction, a latitudinal direction, and a transverse direction, the aircraft including a fuselage extended along the longitudinal direction to which a pair or more of wings attaches along the transverse direction, the aircraft comprising:

a wing extended from the fuselage, the wing comprising a pylon, wherein the wing defines a leading edge and a trailing edge, wherein the leading edge defines a forward plane, and wherein the trailing edge defines an aft plane; and a gas turbine engine coupled to the pylon of the wing, wherein the engine comprises:

a fan assembly comprising a plurality of fan blades rotatably coupled to a fan rotor; and a LP turbine defining an outer flowpath, wherein the outer flowpath defines a first outer flowpath radius at an upstream-most end of the LP turbine, a last outer flowpath radius disposed at a downstream-most end of the LP turbine, and a middle outer flowpath radius disposed therebetween along the longitudinal direction, wherein the middle outer flowpath radius is greater than the last outer flowpath radius, wherein the middle outer flowpath radius is greater than the first outer flowpath radius, wherein the LP turbine further defines an inner flowpath, wherein the inner flowpath further defines a first inner flowpath radius corresponding to a first turbine rotor, a last inner flowpath radius corresponding to a last turbine rotor, a middle inner flowpath radius corresponding to one or more rotors therebetween along the longitudinal direction, and wherein the last inner flowpath radius is less than the middle inner flowpath radius and the first inner flowpath radius.

* * * * *